(12) United States Patent
Mei et al.

(10) Patent No.: US 8,504,422 B2
(45) Date of Patent: Aug. 6, 2013

(54) ENHANCING PHOTO BROWSING THROUGH MUSIC AND ADVERTISING

(75) Inventors: Tao Mei, Beijing (CN); Xian-Sheng Hua, Beijing (CN); Shipeng Li, Palo Alto, CA (US); Jinlian Guo, Anhui (CN); Fei Sheng, Beijing (CN)

(73) Assignee: Microsoft Corporation, Redmond, WA (US)

( * ) Notice: Subject to any disclaimer, the term of this patent is extended or adjusted under 35 U.S.C. 154(b) by 495 days.

(21) Appl. No.: 12/786,020

(22) Filed: May 24, 2010

(65) Prior Publication Data
US 2011/0288929 A1 Nov. 24, 2011

(51) Int. Cl.
*G06Q 30/00* (2006.01)

(52) U.S. Cl.
USPC ..................................... 705/14.42; 707/728

(58) Field of Classification Search
USPC .......................................................... 705/14
See application file for complete search history.

(56) References Cited

U.S. PATENT DOCUMENTS

| | | | |
|---|---|---|---|
| 2004/0027369 A1 | 2/2004 | Kellock et al. | |
| 2006/0239591 A1 | 10/2006 | Kim et al. | |
| 2007/0064121 A1 | 3/2007 | Issa et al. | |
| 2008/0092054 A1 | 4/2008 | Bhumkar et al. | |
| 2008/0110322 A1* | 5/2008 | Lee et al. | 84/611 |
| 2008/0250328 A1* | 10/2008 | Konttinen | 715/747 |
| 2009/0216622 A1* | 8/2009 | Hoashi et al. | 705/10 |
| 2010/0325135 A1* | 12/2010 | Chen et al. | 707/759 |
| 2011/0081101 A1* | 4/2011 | Chien | 382/305 |
| 2012/0144282 A1* | 6/2012 | Loeb et al. | 715/205 |

OTHER PUBLICATIONS

Chen, Weng, Jeng, Chuang, "Emotion-based Music Visualization using Photos", retrieved on Apr. 17, 2010 at <<http://citeseerx.ist.psu.edu/viewdoc/download?doi=10.1.1.106.3642&rep=rep1&type=pdf>>, Springer Berlin , Proceedings of Multimedia Modeling Conference (MMM), Lecture Notes in Computer Science: Advances in Multimedia Modeling , vol. 4903, Jan. 2008, pp. 358-368.

Dunker, Nowak, Begau, Lanz, "Content-based Mood Classification for Photos and Music", retrieved on Apr. 17, 2010 at <<http://www.ismll.uni-hildesheim.de/lehre/semML-09s/script/p97-dunker.pdf>>, ACM, Proceeding of Conference on Multimedia Information Retrieval (MIR), 2008, pp. 97-104.

Lu, Zhang, Li, "Content-based audio classification and segmentation by using support vector machines", retrieved on Apr. 17, 2010 at <<http://www.springerlink.com/content/96h1v3dvje9qd3tp/fulltext.pdf?page=1>>, Springer-Verlag, Multimedia Systems 8, 2003, pp. 482-492.

(Continued)

*Primary Examiner* — Arthur Duran
*Assistant Examiner* — Christopher Busch
(74) *Attorney, Agent, or Firm* — Lee & Hayes, PLLC

(57) ABSTRACT

Techniques for recommending music and advertising to enhance a user's experience while photo browsing are described. In some instances, songs and ads are ranked for relevance to at least one photo from a photo album. The songs, ads and photo(s) from the photo album are then mapped to a style and mood ontology to obtain vector-based representations. The vector-based representations can include real valued terms, each term associated with a human condition defined by the ontology. A re-ranking process generates a relevancy term for each song and each ad indicating relevancy to the photo album. The relevancy terms can be calculated by summing weighted terms from the ranking and the mapping. Recommended music and ads may then be provided to a user, as the user browses a series of photos obtained from the photo album. The ads may be seamlessly embedded into the music in a nonintrusive manner.

20 Claims, 6 Drawing Sheets

OTHER PUBLICATIONS

"MAGIX Xtreme PhotoStory on CD & DVD 8", retrieved on Apr. 17, 2010 at <<http://www.softsea.com/review/MAGIX-Xtreme-PhotoStory-on-CD-DVD.html>>, MAGIX AG, 2009, pp. 1-13.

Mei, Hua, Lai, Yang, Zha, Liu, Gu, Qi, Wang, Tang, Yuan, Lu, Liu, "MSRA-USTC-SJTU at TRECVID 2007: High-level Feature Extraction and Search", retrieved on Apr. 17, 2010 at <<http://citeseerx.ist.psu.edu/viewdoc/download?doi=10.1.1.102.6321&rep=rep1&type=pdf>>, NIST Workshop (TRECVID), TREC Video Retrieval Evaluation Online Proceedings, 2007, pp. 1-12.

Wu, Li, "A Study of Image-based Music Composition", retrieved on Apr. 17, 2010 at <<http://www.sfu.ca/~xwa6/ICME/final.pdf>>, IEEE Proceedings of Conference on Multimedia and Expo (ICME), 2008, pp. 1345-1348.

Wu, Wang, Ho, Lin, Hu, Weng, Chan, Yang, Yang, Hung, Chuang, Chen, Chen, Chen, Jeng, "Interactive Content Presentation Based on Expressed Emotion and Physiological Feedback", retrieved on Apr. 17, 2010 at <<http://mpac.ee.ntu.edu.tw/~yihsuan/pub/MM08_int.pdf>>, ACM, Conference on Multimedia (MM), 2008, pp. 1-2.

* cited by examiner

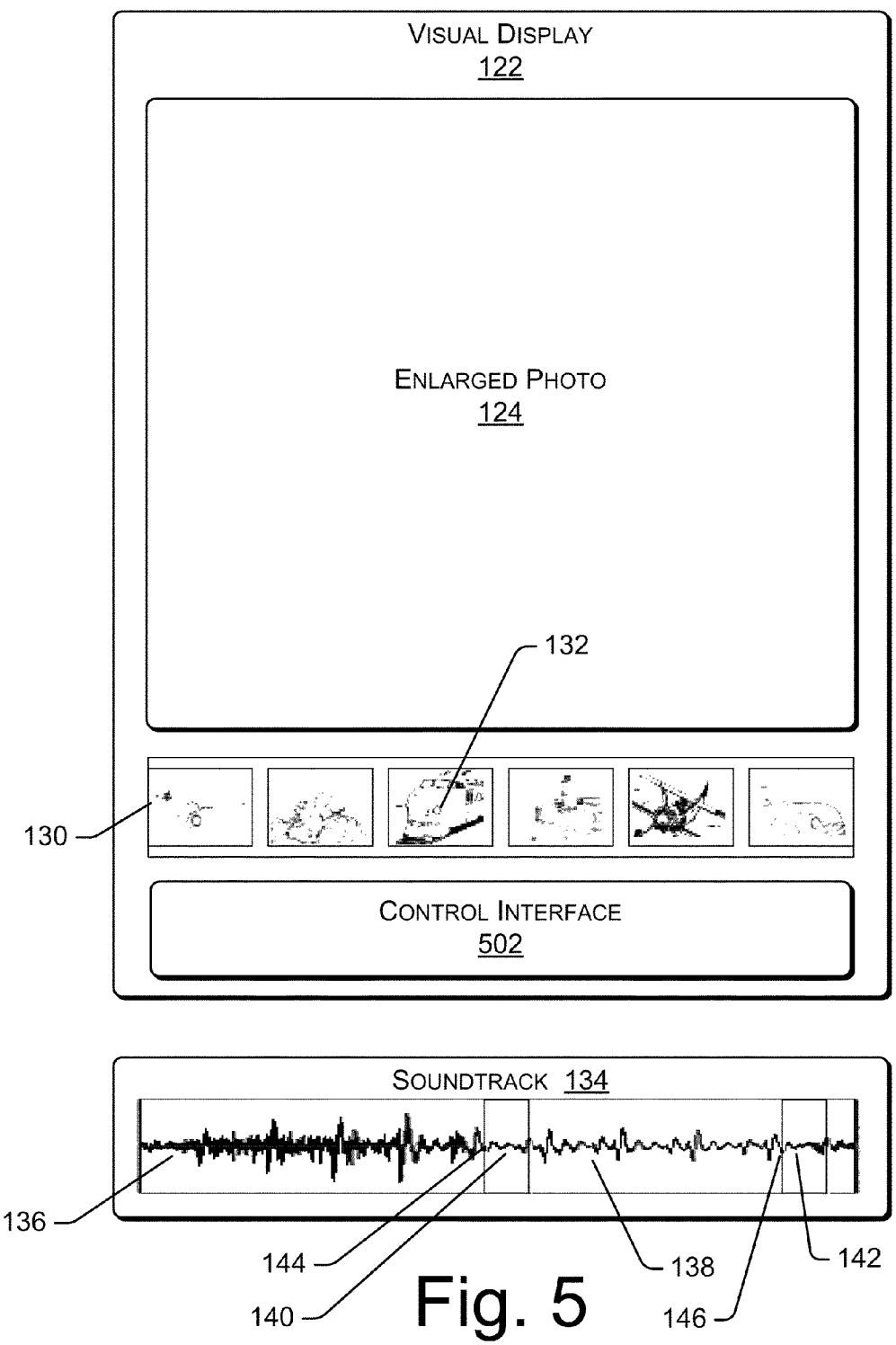

ENHANCING PHOTO BROWSING THROUGH MUSIC AND ADVERTISING

BACKGROUND

Photographs taken with digital cameras are frequently assembled into virtual photo albums. Such photo albums can be located online or within local memory. A user may view such photo albums using a device, such as a computer or handheld device. Such a viewing may be accomplished with software associated with the album, and may display a sequence of photos to the user.

Multimedia content can integrate video and/or images with an audio track. However, known multimedia fails to match images with an appropriate audio track in a harmonious manner. Particularly, such integrations fail to provide consistent, effective and harmonious integration that advantageously matches visual images with an audio track.

SUMMARY

Techniques for recommending music and audio advertising to form an audio track that will enhance a user's experience while photo browsing are described herein. A ranking process may be used to rank musical passages and advertisements for relevance to at least one photo from a photo album. The ranking process may utilize text-based metadata of the musical passages, the advertisements and the at least one photo. A mapping process may be used to map the musical passages, the advertisements and the at least one photo into a style and mood ontology. The mapping may result in vectors having two or more dimensions, with each dimension having a coefficient associated with a human condition within the style and mood ontology. A re-ranking of the musical passages and the advertisements may be performed to obtain a relevance of each musical passage and each advertisement to the at least one photo. The re-ranking process may sum a weighted relevancy term from the ranking and a weighted relevancy term from the mapping. Output may be provided, including one or more photos from the photo album, a musical passage and an advertisement, such that the musical passage and the advertisement were selected based at least in part on the re-ranking.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 5 is a diagram illustrating an example user interface, configured to provide photo browsing enhanced by recommended music and advertising.

DETAILED DESCRIPTION

Figure 1:
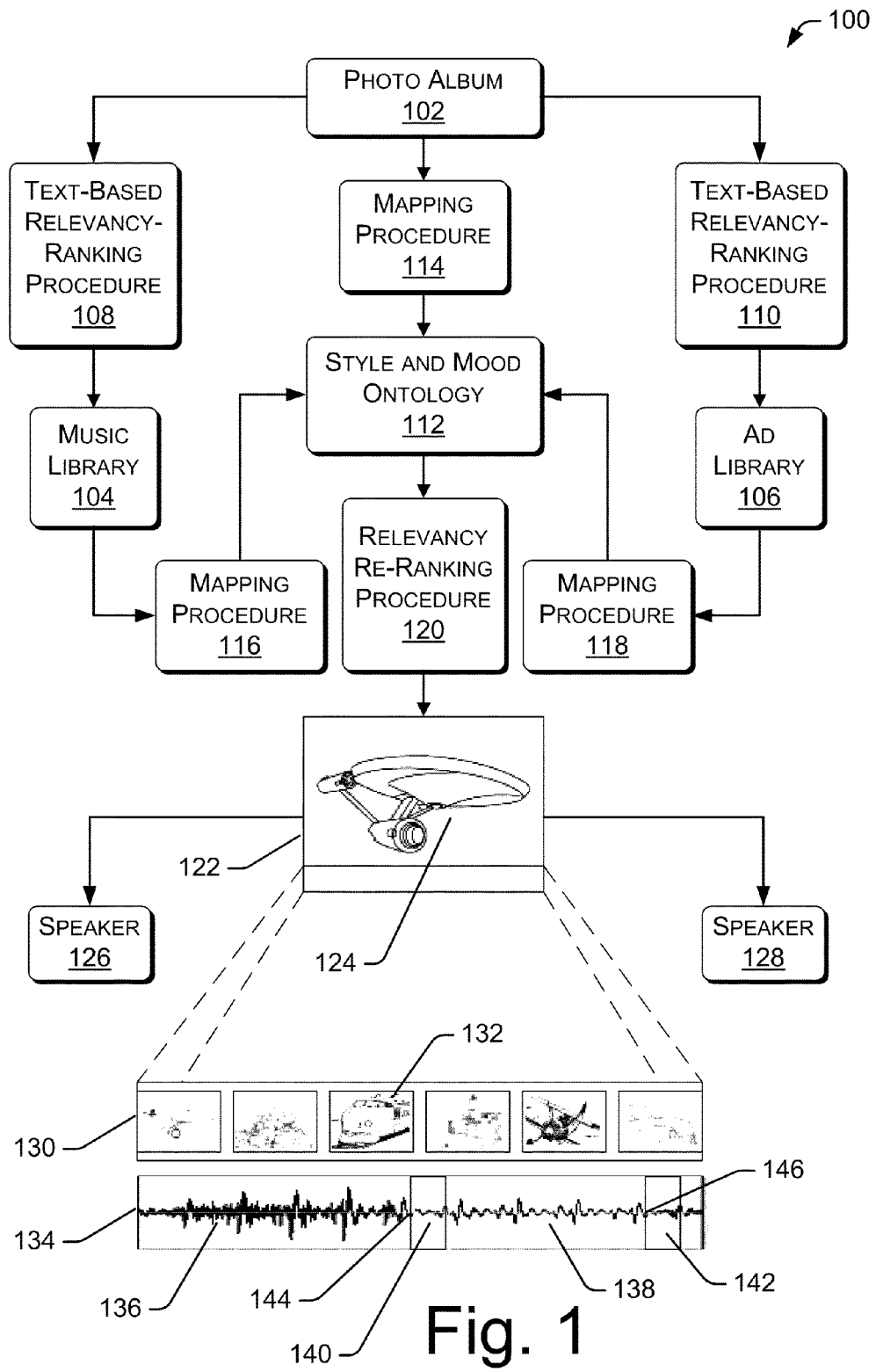
FIG. 1 is a diagram illustrating an example of a functional architecture or configuration that provides photo browsing enhanced by recommended music and advertising. Text-based searching ranks music from a music library and ads from an ad library for relevancy to a photo album. Mapping photos, music and ads to a style and mood ontology generates vectors that allow re-ranking of the music and ads for relevancy to the photo album. Aspects of a user interface are shown, which allow sequential display of the photos accompanied by music interspersed with ads.

The disclosure describes techniques for providing users with an enhanced photo browsing experience. The photo browsing enhancements include techniques for determining appropriate music and/or audio advertising to recommend and/or provide to a user during the photo browsing experience. An example illustrating some of the techniques discussed herein—not to be considered a full or comprehensive discussion—may assist the reader.

A ranking process, which may use a text-based algorithm, ranks songs and ads for relevance to at least one photo from a photo album, and thereby obtains a first relevancy term. The text-based algorithm may find text in metadata associated with the photos, songs and advertisements. Alternatively, the text may be obtained from a document within which the photo, song or ad is located. In some examples, speech-to-text translation of an audio document may provide the text.

The songs, ads and one or more photos from the photo album can then be mapped to a style and mood ontology to obtain vector-based representations for each of the songs, ad and photos mapped. The style and mood ontology can include a vector space, where dimensions are associated with human conditions. Examples of the human conditions defined by the style and mood ontology can vary; however, in a representative example, the human conditions can include: aggressive, arousal, euphoric, pleasant, calm, non-arousal, melancholic and unpleasant. The vector-based representations can include real valued terms associated with each dimension of the vector. The real-value terms of each dimension of the vector can represent a "fit" of one human condition to the song, ad or photo being mapped into the style and mood ontology. Thus, the vector-based representations can be used to describe a song, audio ad or photo in terms of the human conditions defined by the ontology.

A re-ranking process can be used to generate a second relevancy term for each song and each ad indicating relevancy to the photo album. The re-ranking process may utilize a distance function, which obtains a scalar term indicating a distance from each vector-based representation of a song or ad to the vector-based representation of the photo album. In some instances, a shorter distance results in greater relevance.

An overall relevancy term can then be calculated for each song and each ad by summing a weighted value of the first relevancy term from the text-based ranking and a weighted value of the second relevancy term from the mapping to the style and mood ontology. The relevancy terms can then be used to provide recommended music and ads to a user interface, as the user views a series of photos obtained from the photo album.

The discussion herein includes several sections. Each section is intended to be non-limiting; more particularly, this entire description is intended to illustrate components which may be utilized in a photo browsing architecture, but not components which are necessarily required. The discussion begins with a section entitled "Example Photo Browsing Architecture," which describes one environment that may implement the techniques described herein. This section depicts and describes a high-level architecture, as well as illustrative components configured to recommend music and advertising. Next, a section entitled "Example Photo Browser User Interface" illustrates and describes aspects that can be used to provide content to a user, including photo, music and advertising content. This section addresses aspects that may be used to provide both audio and video (including still graphics) to a user. A third section, entitled "Example Flow Diagrams" illustrates and describes techniques that may be used to provide photo browsing that is enhanced by recommended music and advertising. Finally, the discussion ends with a brief conclusion.

This brief introduction, including section titles and corresponding summaries, is provided for the reader's convenience and is not intended to limit the scope of the claims, nor the proceeding sections.

Example Photo Browsing Architecture

FIG. 1 is a diagram illustrating an example functional architecture, configuration or system 100 that provides photo browsing enhanced by recommended music and advertising. Accordingly, the example of FIG. 1 is provided as a specific instance to illustrate more general concepts, and not to indicate required and/or necessary elements.

Referring to FIG. 1, a photo album 102 includes one or more photographs. Photographs or "photos" can be any image, either in printed ("hardcopy") form, or recorded in memory. Photos recorded in memory may be configured as a file, object or other data structure, in a file format appropriate for the device upon which the file is stored, or the use to which the file is to be put. Photos may be obtained by operation of a camera or camera-like device (e.g., a cell phone). Additionally, photos can be obtained by operation of image manipulation applications, such as Photoshop® or alternatives. And further, photos can be obtained by a capture device, having hardware and/or software components, which may be associated with a computer's video card or other image processing device.

The photo album may be located on a user's desktop (i.e., located within the user's computer and associated memory devices) and/or on a server remote from the user. Accordingly, access to the photo album by a user may or may not require access to a network. The photo album 102 may assume any of several configurations. In one example, the photo album resides on the user's own computer, and may comprise photos taken by the user, such as of family, pets, friends, home, family trips and related topics. In a second example, the photo album 102 may reside on a remote server, and also contain photos of the user's family, pets, friends, home, family trips and related topics. However, location of the photo album 102 on a remote server may advantageously facilitate transfer of the photos to family and friends not sharing the user's computer.

In another example, to further illustrate the extensibility of the configuration 100, the photo album 102 resides on a remote server, but is owned by a third party (e.g., a corporation, and not the user or the user's family and/or friends). In this example, the photo album 102 may provide photos which collectively are "content" that is of interest to viewers, such as a user of the system 100. In this example, the photo album 102 would attract viewers (e.g., website visitors) interested in the content, which may include professionally taken photos of nature, cities, famous people and the like. Such a commercially prepared photo album may result in substantial website "hits" as photos are viewed by remotely located users.

A music library 104 may include one or more songs or "musical passages". Both "song" and/or "musical passage" are to be considered broadly, such that a song or musical passage can be a collection of songs, an album of songs, a fragment of a song, a collage of songs and/or song fragments, or any other similar or different audio content. The music library may be located on a user's computer and/or located on a remote server. Accordingly, access to the music library by a user may or may not require access to a network.

An ad library 106 may include one or more audio advertisements. The audio advertisements may include voice, music or any sound desired or advantageous for conveying a commercial, public service announcement or other informational, commercial or entertainment-based message enabled in an audio format.

Each of the photo album 102, the music library 104 and the ad library 106 may include text data associated with one or more of the photos, songs/musical passages, and ads, which are respectively contained within each album or library. That is, each photo, song and ad, within the photo album 102, the music library 104 or the ad library 106, may be associated with text. Such text is typically in the form of metadata, which is data about data—that is, data about the photo, song or advertisement. The metadata may be found within a computer data file that contains the photo, song or advertisement. For example, many file formats, such as those associated with computer files containing pictures or sound, may have locations wherein metadata is contained. Accordingly, text—typically in the form of metadata—may be located within a file structure where it is easily searchable.

Alternatively, different ones of the photos, songs, musical passages and/or ads contained within the photo album 102, the music library 104 and the ad library 106 may also be associated with text that is obtained from areas within a document that surround the photo, song and/or advertisement. For example, if a photo is in a document containing text, portions of the text adjacent to the photo may be associated with photo. As a further example, if an audio advertisement has speech within the ad, related text—obtained, for example, by speech-to-text technology—can be associated with the advertisement.

The photo browsing system 100 may include text-based relevancy-ranking procedures 108, 110. The text-based relevancy-ranking procedures 108, 110 may be configured to search for text within the music library and ad library, respectively. Additionally, the text-based relevancy-ranking procedures 108, 110 may analyze the text, and ascribe a relevance of each song and each ad within each respective library to the photo album, based on the analysis of text. The text-based relevancy-ranking procedures 108, 110 may be based on known text-based algorithms. Such algorithms analyze text, and can thereby determine the relevancy of each song and/or each ad to the photo album 102. Examples of known technology which may support portions of the text-based relevancy-ranking procedures 108, 110 include the vector space model (VSM) or the Okapi BM25 algorithms.

Accordingly, the text-based relevancy-ranking procedure 108 is configured to search the text—e.g. metadata—associated with songs within a music library 104 to find those songs (and/or musical passages) relevant to the photo album 102. For instance, the procedure 108 may identify songs that are associated are with text that is similar and/or relevant to the text associated with one or more photos of the photo album 102. Similarly, the text-based relevancy-ranking procedure 110 is configured to search text associated with ads (i.e., audio advertisements and/or public service announcements or the like) to find audio advertisements relevant to the photo album 102. Text associated with the ads can include metadata, text surrounding the ad in the context in which it is located, or text obtained by speech-to-text translation of the advertisement.

The determination of the relevancy of a song or an ad to the photo album may be based on text associated with one representative photo from the photo album 102. Alternatively, the determination may be based on text associated with many or all of the photos of the photo album 102. In both cases, the text-based relevancy-ranking procedures 108, 110 are configured to rank music from the music library 104 and ads from the ad library 106 based on relevance to the photo album 102. Accordingly, the procedures 108, 110 may be used to create a first relevancy term for each song and for each ad within the music library 104 and the ad library 106, respectively, based on relevancy to the photo album 102.

Figure 2:
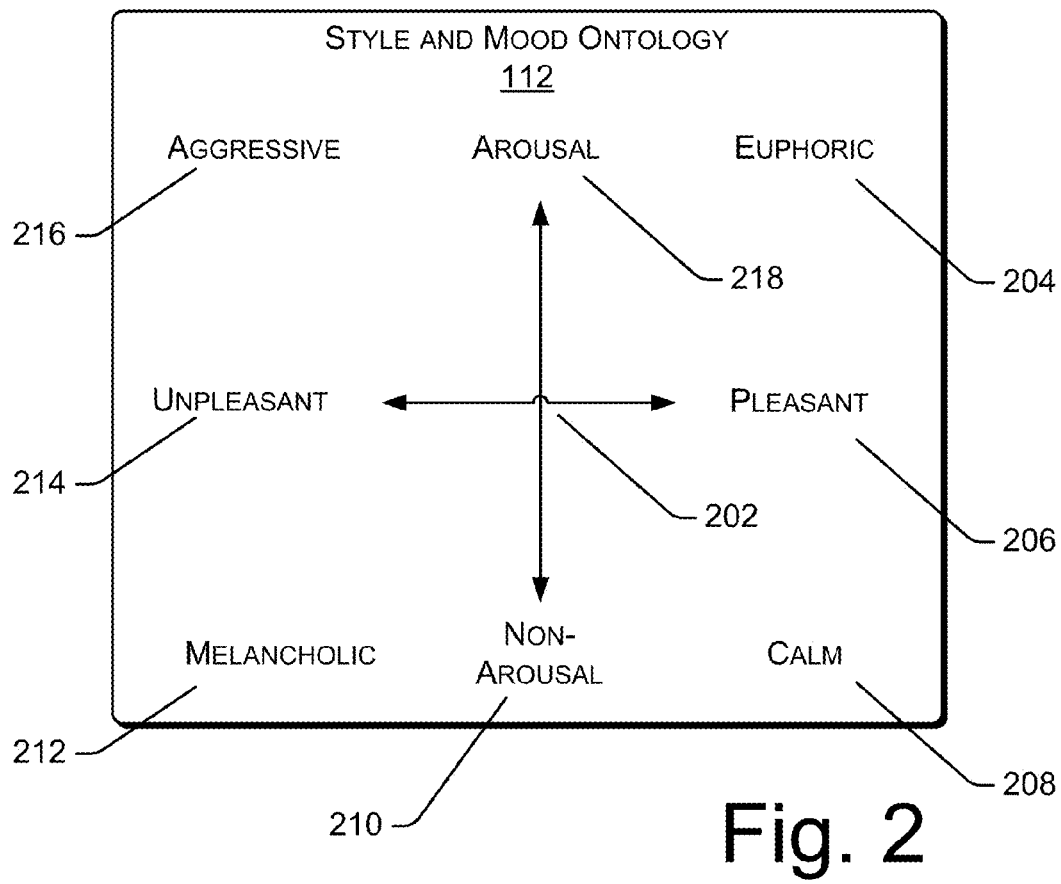
FIG. 2 is a diagram illustrating an example of the style and mood ontology introduced in FIG. 1. As illustrated, the style and mood ontology is 8-dimensional, in this example, having dimensional components related to human conditions. Moreover, the diagram illustrates how an ontology could be generalized to thereby have a desired number of dimensions, each dimension associated with aspects of present interest.

The photo browsing system 100 may include a style and mood ontology 112. The style and mood ontology 112 includes aspects of a vector space, wherein each of the different dimensions within the vector space corresponds to a human condition. The number of dimensions is not fixed, and there is no set requirement governing the nature of any or all of the dimensions. FIG. 2 will more completely describe one example of a style and mood ontology 112 as an 8-dimensional vector space, wherein a human condition is assigned to each vector component (i.e. each orthogonal component vector). Vectors within the style and mood ontology 112 may be described by coefficients associate with each orthogonal unit or component vector. The coefficients may be based on a degree to which qualities of an object (mapped to the vector) are consistent with a quality espoused by a component vector within the vector space.

In a simple 2-dimensional example of a style and mood ontology, if one dimension was happiness and another dimension was activity, then a photo depicting a very happy, very active scene may map to (0.95, 0.92). In this example, 0.95 and 0.92 are coefficients of orthogonal unit vectors associated with the happiness and activity dimensions of the 2-dimensional ontology. Similarly, as an example of the style and mood ontology 112, suppose a photo included metadata, and suppose the photo, perhaps using the metadata, was mapped to the style and mood ontology. If the vector space of the style and mood ontology 112 was 8-dimensional, and if real-valued coefficients are assigned to each orthogonal component vector dimension, the photo may map to the vector space as (0.23, 0.29, 0.88, 0.46, 0.73, 0.43, 0.81, 0.66). This would indicate a degree to which the photo espoused, or was in harmony with, or was consistent with, each of the human qualities within the vector space.

To utilize the style and mood ontology 112, the photo browsing system 100 may include mapping procedures 114, 116, and 118 configured to map photos from the photo album 102, music from the music library 104 and ads from the ad library 106, respectively, into the style and mood ontology. Such mapping may operate in response to text-based techniques, may be manually performed by human workers, or may be performed in another method, as desired or indicated by circumstances.

The photo browsing system 100 may include a relevancy re-ranking procedure 120. The relevancy re-ranking procedure 120 can be used to combine the first relevancy term, as determined by the search performed by the text-based relevancy-ranking procedures 108, 110, with results of a second relevancy term obtained using input from the mapping procedures 114, 116, 118. The relevancy re-ranking procedure 120 may be configured to re-rank some or all of the songs from the music library 104 and some or all of the ads from the ad library 106 according to their relevancy with respect to the photo album 102.

In one example, the relevancy term for each song and for each ad may be computed by the relevancy re-ranking procedure 120 by assigning a relevancy term, R, to quantify the relevance of each song and each ad to the photo album. For example, the relevance, R, may be derived according to $R = w_1 r_1 + w_2 r_2$, for each song and/or each advertisement. In this example, $w_1$ and $w_2$ are scalars used to weight the relevancy terms $r_1$ and $r_2$. In one example, the weights $w_1$ and $w_2$ can be defined such that $w_1 + w_2 = 1$, $0 <= w_1 <= 1$, and $0 <= w_2 <= 1$. The first relevancy term, $r_1$, is a scalar representing relevance of a song or an advertisement to the at least one photo and/or photo album 102, obtained from the ranking of the songs and ads by a text-based relevancy-ranking 108 or 110, respectively.

The second relevancy term, $r_2$, is a scalar representing relevance of the song or advertisement to the at least one photo and/or photo album 102. The $r_2$ term can be obtained using output of the mapping performed by the mapping procedures 114, 116, 118. In particular, the term may be defined as $r_2 = 1 - d(v_1, v_2)$. That is, the distance between vectors $v_1$ and $v_2$, where $v_1$ is the mapping of the photo and/or photo album to the style and mood ontology 112, and $v_2$ is the mapping of the song or ad to the ontology, depending on whether a song or ad relevancy term is being calculated. Thus, d is a distance function, $v_1$ is a vector representing mapping (such as by mapping procedure 114) of the at least one photo to the style and mood ontology 112, and $v_2$ is a vector representing mapping (such as by mapping procedures 116 or 118) of a song or ad to the style and mood ontology 112. Thus, the relevancy re-ranking procedure 120 assigns a relevancy term to each song (e.g. musical passage) and each advertisement. As noted above, the assignment may be made by calculating a relevancy term $R = w_1 r_1 + w_2 r_2$, for each song and for each advertisement.

An example of a user interface, including a visual display 122 and speakers 126, 128 is seen in FIG. 1. The visual display 122 shows a sequence of photos 124. For example, the sequence may be timed to show each photo for a short period, perhaps several seconds, to thereby keep the user entertained in a manner that does not try their attention span. A portion 130 of the sequence of photos may be shown in "thumbnail" or larger format, so that the user can, if desired, divert attention to see thumbnail photos 132 (i.e., smaller versions of photos 124).

While the photos from the album 102 are displayed in sequence on the visual display 122, a "soundtrack" is played through one or more speakers 126, 128. The soundtrack 134 can include one or more songs (and/or musical passages or clips) 136, 138 from the music library 104. The songs or musical passages 136, 138 can be interspersed with one or more audio advertisements 140, 142 from the ad library 106.

The songs 136, 138 and the ads 140, 142 may be selected for play based on their relevancy to the photos being displayed and/or relevancy to the photo album 102. For example, the music library 104 may be ranked against the photo album 102, thereby providing each song with an "R-term," as discussed above. In that example, the songs that are most relevant to the photo album 102 would be played during display of the photos from the photo album 102. Similarly, the ad library 106 may be ranked, thereby providing a relevancy term for each advertisement with respect to the photo album 102. In this example, the ads that are most relevant to the photo album 102 would be played during display of the photos from the photo album 102.

The advertisement insertion points 144, 146 are transition points or segues between a song or musical passage 136 and an advertisement 140. They are points wherein the song is discontinued and an advertisement is begun. The advertisement insertion points 144, 146 may be selected to be the actual end of the song and/or musical passage. Alternatively, the advertisement insertion point 144, 146 can be calculated or selected to be a relatively quiet part of the musical passage, or other location within the passage, that provides a smooth segue to an advertisement 140, 142.

FIG. 2 is a diagram illustrating an example of the style and mood ontology 112 introduced in FIG. 1. The style and mood ontology 112 is conveniently modeled as a vector space, having a coordinate system 202, shown in an abstract manner. Objects, such as photos, songs or ads, which can have characteristics defined by the vector space, can be mapped into the vector space. Moreover, a difference between two such mapped vectors, associated with two objects mapped into the vector space, can be determined by operation of a distance function. Thus, the difference function provides a measure of relevancy between objects that can be mapped into the vector space of the style and mood ontology 112. In some instances, a smaller distance between the vectors of two objects mapped into the vector space of the style and mood ontology 112 indicates more relevance between the objects.

The mapping can be facilitated by an algorithm, using text or metadata associated with each object to be mapped, which maps an object into a vector located within the style and mood ontology 112. Alternatively, the mapping, from object to vector, may be performed by human workers, based on formulas or on intuition and knowledge of photos, songs and advertisements.

The example style and mood ontology 112 of FIG. 2 is 8-dimensional. The dimensions can be associated with eight mutually orthogonal unit vectors. In a mapping process, an object being mapped is associated with coefficients associated with each of eight mutually orthogonal unit vectors, thereby mapping the object (photo, song or ad) into the ontology 112. While the style and mood ontology 112 is 8-dimensional, it could alternatively comprise a different number of dimensions, as indicated by constraints of a given application.

The example style and mood ontology 112 of FIG. 2 includes dimensions related to human conditions. In the example, the human conditions include: euphoric 204, pleasant 206, calm 208, non-arousal 210, melancholic 212, unpleasant 214, aggressive 216 and arousal 218. While style and mood ontology 112 includes the recited human conditions, it could alternatively include other conditions.

Figure 3:
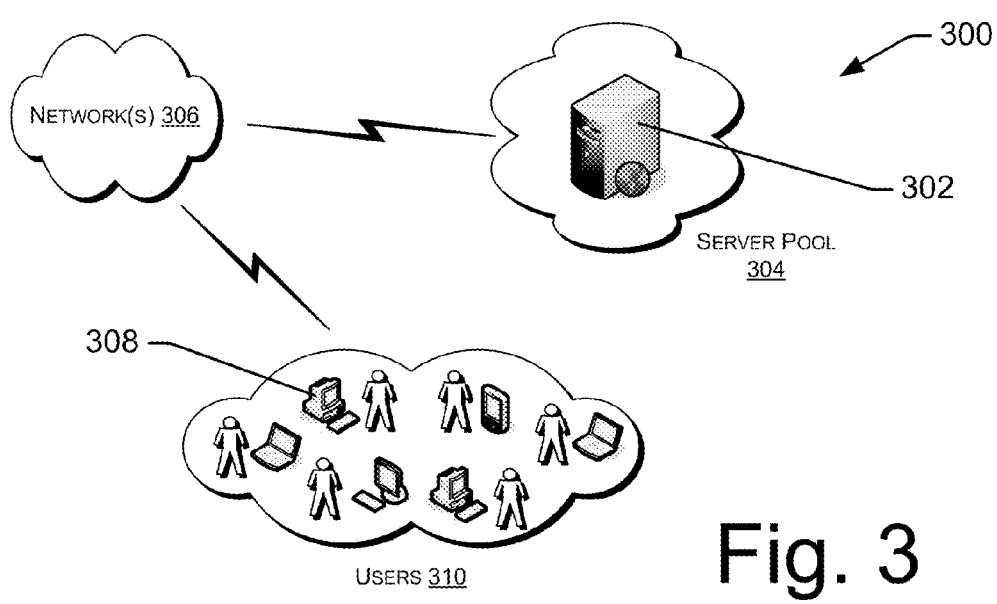
FIG. 3 is a diagram illustrating a networked environment suitable for support of several differently configured photo browsing configurations. In particular, the photo album, the music library and the ad library (seen in FIG. 1) may be situated on a server, a user's computer, and/or both.

FIG. 3 is a diagram illustrating a networked environment 300 suitable for support of several differently configured photo browsing configurations. In particular, some, all or none of the photo album, the music library and the ad library (102, 104, 106, respectively, as seen in FIG. 1) may be located on a server 302 within a server pool 304. Alternatively, some, all or none of the photo album, the music library and the ad library, are located on any computer 308 operated by any of a plurality of users 310, in communication with the server 302 over a network 306. Alternatively, the photo album, the music library and the ad library may be distributed among the server 302 and the user's computer 308.

As an example, the music library and the ad library may be located on the server 302, while the photo album may be located on the computer 308 of a user 310. In such an example, the photo browsing system, enhanced by music and advertising recommendations, might examine the user's photo album using the network 306 and provide recommendations for music and advertisements to accompany display of photos from the photo album. The system might provide, in addition to the recommendations, the music and ads to the user. In such an example, the computer 308 of the user 310 may be considered a "client computer" in that it receives musical passages 136, 138 and/or advertisements 140, 142 from the server 302.

As a second example, the photo album, the music library and the ad library may be located on the server 302. Location of the photo album on the server 302 is consistent with ownership of the photo album by a content provider, whose business model may involve encouraging visits to a website providing photo content to users. Location of the photo album on the server 302 is also consistent with ownership of the photo album by the user, who may locate the photo album on a third party website so that friends and family can conveniently visit the website and view and/or download the photographs. In this second example, the photo browsing system, enhanced by music and advertising recommendations, might examine the photo album and provide music and possibly ads to the user.

Figure 4:
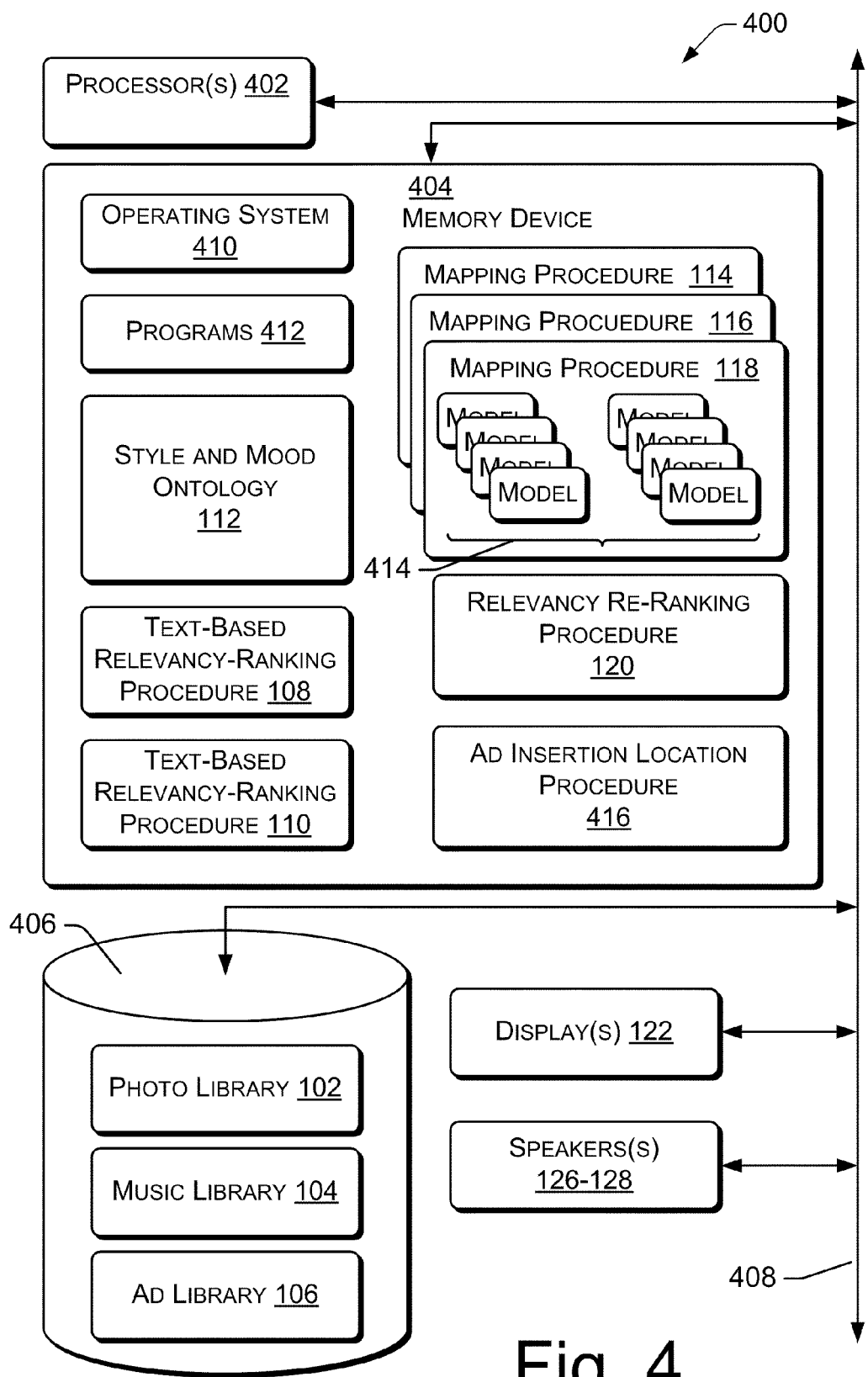
FIG. 4 is a block diagram showing a further example configuration that provides photo browsing enhanced by recommended music and advertising.

FIG. 4 is a block diagram showing a further example of a computing device 400 of the configuration that provides photo browsing enhanced by recommended music and advertising. The computing device 400 may be defined on, or defined by: the user's computer 308 (e.g., see FIG. 3); a server 302 (e.g., see FIG. 3); a distribution over two or more devices; or any portable, mobile, hand-held, hybrid or innovative device yet to be developed, configured to perform photo browsing with recommended music and advertisements. A processor 402 is in communication with a memory device 404 and a disk memory device 406 over a bus 408. The processor 402 may include a micro processor, a video card, a memory management unit, I/O (input/output) devices and/or other information processing devices. A visual display device 122 and one or more audio speakers 126-128 are also in communication with the processor(s) 402. The memory device 404 can be a random access device (RAM) or other device and/or technology, as indicated by the needs of a particular application. The memory device may include an operating system 410 and one or more programs 412. Such programs can include computer-readable and/or processor readable statements, which when executed by the processor 402, result in execution of one or more methods, such as methods of photo browsing enhanced by recommended music and ads.

The text-based relevancy-ranking procedures 108, 110 can be configured in executable code (e.g. computer/processor executable statements) as text-based searching algorithms. As seen in FIG. 1, the text-based relevancy-ranking procedures 108, 110 perform a text-based search of text (e.g. metadata) associated with the music library 104 and the advertisement library 106, to find songs and advertisements, respectively, most relevant to the photo album 102. Accordingly, the text-based relevancy-ranking procedures 108, 110 can be an executable program, application or procedure that implements a VSM (vector space model) algorithm, an Okapi BM25 algorithm, or the like.

The style and mood ontology 112 may be defined within memory device 404. As such, the style and mood ontology 112 can be an object, data structure or other article of data and/or executable code.

Three mapping procedures 114-118 can be configured in executable code (e.g. computer/processor executable statements) as mapping algorithms configured to map photos, music (songs/musical passages) and advertisements, respectively, to the style and mood ontology 112. Each mapping procedure 114-118 can include one or more models 414 for mapping input to a particular component vector within the style and mood ontology 112. For example, a model 414 can use an input of text from metadata from a photo to derive a real-valued coefficient term for a component vector (e.g., a component vector associated with a human factor such as "pleasant") within the style and mood ontology 112. That is, the model may consider the metadata of the photo with respect to the human factor "pleasant," and derive a real-valued coefficient for a component vector, such as 0.8, based on a scale of zero to one. Such a coefficient would indicate a fairly strong connection between the photo and the "pleasant" component vector. By applying each model to the metadata of the photo, coefficient terms for component vectors associated with all dimensions within the vector space of the style and mood ontology 112 could be obtained. Such coefficients could be written and/or stored as an n-tuple, and would represent a mapping of the photo into the vector space of the ontology. Similarly, models associated with each mapping procedure 114-118 could be used to map photos, music and ads into the multi-dimensional vector space of the music and style ontology.

In one example, the mapping function or mapping procedure 116 can be configured to map a song or musical passage to the style and mood ontology based at least in part on an evaluation of the song or passage for one or more of tempo, pitch and intensity. Tempo is a measure of the speed or pace of the music, and is a factor in the mood of the music. Pitch is the frequency of the musical sounds, is also an influence on the mood of the music. Intensity can be related to mood and emotion, and is a measure of the volume, loudness or more precisely the sound power per unit area of the music. Having evaluated one or more of the tempo, pitch and intensity, these factors can be compared to each of the plurality of human conditions. By such comparison, a real number result can be obtained, indicating a degree to which the evaluated tempo, pitch and intensity fit orthogonal unit vectors associated with each human condition. The real number result can be based on operation of an algorithm within each of the models 414, the judgment of a human worker or other method, as desired.

The relevancy re-ranking procedure 120 can be configured in executable code (e.g. computer/processor executable statements) as an algorithm configured to calculate relevancy of each song and/or musical passage and each ad to the photo album, either as a whole or as represented by a selected representative photograph(s). As noted in the discussion of FIG. 1, the relevancy re-ranking procedure 120 receives input from the text-based relevancy-ranking procedures 108, 110 and the mapping procedures 114-118 to derive a relevancy term for each musical passage and each advertisement with respect to the photo album 102.

An ad insertion location procedure 416 can be configured in executable code (e.g. computer/processor executable statements) as an algorithm configured to determine a desirable point in an audio stream at which to insert an audio advertisement. As noted in the discussion of FIG. 1, the ad insertion location procedure 416 selects a transition point or segue between a song and an ad, which can be considered to be an "insertion point." An insertion point is a point at which a song is discontinued and an advertisement is begun. Such points can be the actual end of the song or a relatively quiet part of the musical passage, or other location within the song, that provides a smooth segue to an advertisement.

The disk 406 or similar memory device (e.g. a solid state "disk") may contain the photo library 102, the music library 104 and/or the ad library 106. As noted in the discussion of FIG. 3, each of the photo library 102, the music library 104 and/or the ad library 106 may be located on the server (e.g., server 302 of FIG. 3) or user device (e.g., user computer 308 of FIG. 3).

Example Photo Browsing User Interface

FIG. 5 is a diagram illustrating an example user interface 500, configured to provide photo browsing enhanced by recommended music and advertising. In the example interface 500, a visual display 122 may include all or part of the screen of a device. In a different example, a window, defined in a computer monitor, provides a visual display 122 in which an enlarged view of a photo 124 is displayed. In the example of FIG. 5, a continuous stream or sequence of photos 124 is displayed in an enlarged format. For example, each photo 124 in the continuous stream may be displayed for one or several seconds, allowing the user to view each photo completely, without becoming bored with any photo.

Optionally, a portion 130 of a sequence of photos to be displayed may be shown simultaneously with the enlarged photo 124, such as in a reduced size format. The displayed portion 130 of the sequence allows the user to anticipate upcoming photos or to refer back to photos previously displayed in large format photo 124.

A control interface 502 may provided soft-keys for control over the user interface 500 in some applications, particularly including mobile devices or other applications where a touch screen is provided. In other applications, a mouse, keyboard and/or voice-controlled interface is alternatively used.

The soundtrack 134 provides musical passages 136, 138 and/or advertisements 140, 142 selected for relevancy to one or more photos 124 from the photo album 102. The selected musical passages 136, 138 and the selected advertisements 140, 142 are played by the user interface 500 while a user browses the photographs 124 displayed in a sequential manner on the visual display 122. Thus, one or more musical passages 136 can be played, optionally followed by one or more audio and/or video advertisements 140. This process may be repeated by with one or more additional musical passages 138 and advertisements 142. The musical passages 136, 138 can be separated from the advertisements 140, 142 by advertisement insertion points 144, 146.

Example Flow Diagrams

Figure 6A:
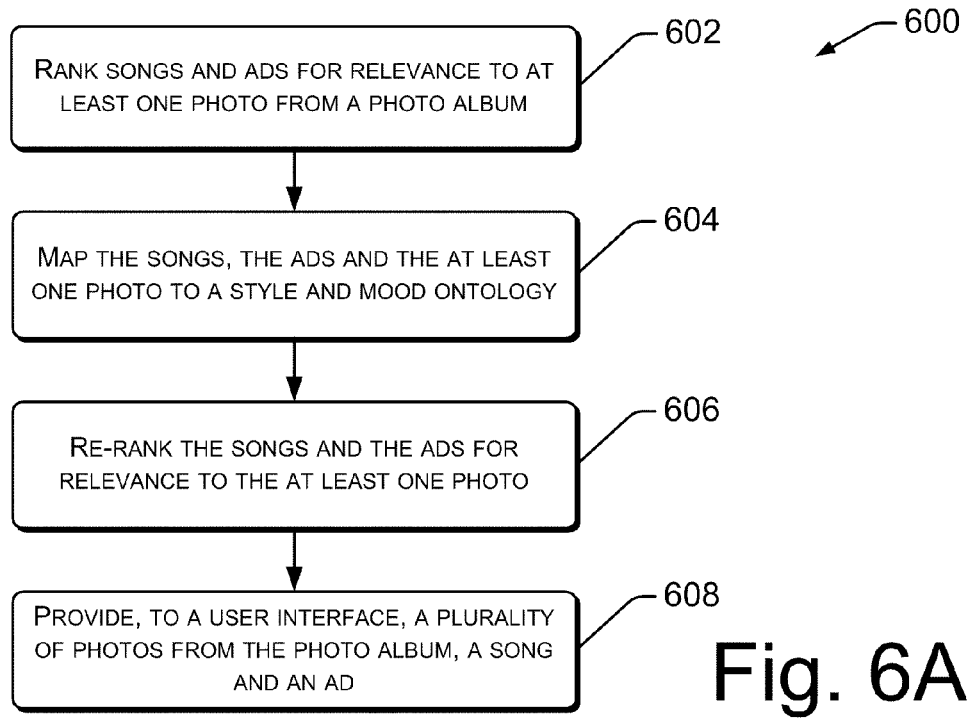
FIG. 6A is a flow diagram illustrating an example process for providing photo browsing enhanced by recommended music and advertising. The example process of FIG. 6A can be understood, in part, by reference the configuration of FIG. 1 or 4—although the concepts of FIG. 6A are not exclusive to a particular system or configuration.

FIG. 6A is a flow diagram illustrating an example process 600 for providing photo browsing enhanced by recommended music and advertising. The example process of FIG. 6A can be understood in part by reference the configuration of FIG. 1 or 4. However, FIGS. 6A-C contain general applicability, and are not limited by other drawing figures and/or prior discussion.

Each process described herein is illustrated as a collection of blocks in a logical flow graph, which represent a sequence of operations that can be implemented in hardware, software, or a combination thereof. In the context of software, the blocks represent computer-executable instructions stored on one or more computer-readable storage media, such as cds or dvds, that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At operation 602, songs and ads are ranked for relevance to at least one photo from a photo album. In one example, the ranking is performed by utilizing text associated with the songs, ads and at least one photo. In particular, text-based metadata associated with a photo, song or advertisement can be used. Alternatively, text found in a document that may be associated with a song, photo or ad could be used. Such alternative text could include the caption of a photo, text associated with a link to a song or advertisement, or text derived from speech to text translation. The ranking operation can be performed by a software procedure, such as text-based relevancy-procedures 108, 110 seen in FIGS. 1 and 4.

At operation 604, the songs, the ads and the at least one photo are mapped to a style and mood ontology to obtain vector-based representations for each song, each ad and the at least one photo. In one example, the vector-based representations comprise real-valued coefficients for each orthogonal unit vector in the vector space of the style and mood ontology. That is, a coefficient associated with each dimension of the vector space of the style and mood ontology is derived for each mapping. In a further example, each component-vector term is associated with one of a plurality of human conditions within the style and mood ontology. In the examples of FIGS. 1 and 4, the mapping can be performed by mapping procedures 114-118.

At operation 606, the songs and the ads are re-ranked for relevance to the at least one photo. The re-ranking may be performed by summing a weighted relevancy term from the ranking and a weighted relevancy term from the mapping. As one example of the summation, each song and each ad could be assigned a relevancy term according to: $R=w_1 r_1 + w_2 r_2$. According to such an example, the relevancy re-ranking procedure 120 of FIGS. 1 and 4 could be used to provide a relevancy term for each song and for each audio advertisement with respect to the photo album (or representative subset of photos).

At operation 608, a plurality of photos from the photo album and a song are provided for consumption by a user interface. In one example, the photos are provided for sequential display while the song(s) or other musical passage(s) are played. Optionally, an audio advertisement is also provided, and can be introduced at an insertion point in the audio stream and/or audio track played by the user interface. The insertion point is selected to result in a smooth transition or segue between song and advertisement. In one example, the song(s) and the ad are selected based on the ranking, mapping and re-ranking of operations 602-606.

Figure 6B:
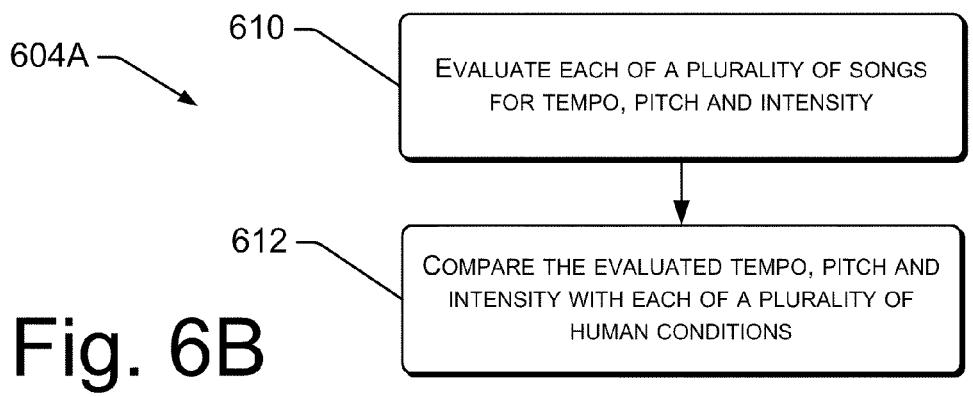
FIGS. 6B and 6C are flow diagrams illustrating added, alternative and/or supplemental aspects to the example of FIG. 6A.

FIG. 6B describes an alternative and/or supplemental operation 604B to the mapping operation of block 604. At operation 610, each of a plurality of songs is evaluated for tempo, pitch and intensity. At operation 612, the evaluated tempo, pitch and intensity are compared with each of the plurality of human conditions. Such a comparison can result in generation of a real number indicating a degree to which the evaluated tempo, pitch and intensity fit each human condition. Accordingly, a coefficient is generated for a unit vector according to each orthogonal unit vector in the vector space of the style and mood ontology. For example, the mapping procedure 116 of FIGS. 1 and 4 could be used to evaluate the tempo, pitch and intensity of one or more songs, and to then map the songs to the style and mood ontology, using results from the evaluated tempo, pitch and intensity. The mapping could result in generation of coefficients associated with each dimension in the style and mood ontology 112, indicating a degree of correlation between the tempo, pitch and intensity of a song and the human emotion associated with the dimension. In one example, such coefficients are real numbers, ranging in magnitude from 0 to 1 inclusive.

Figure 6C:
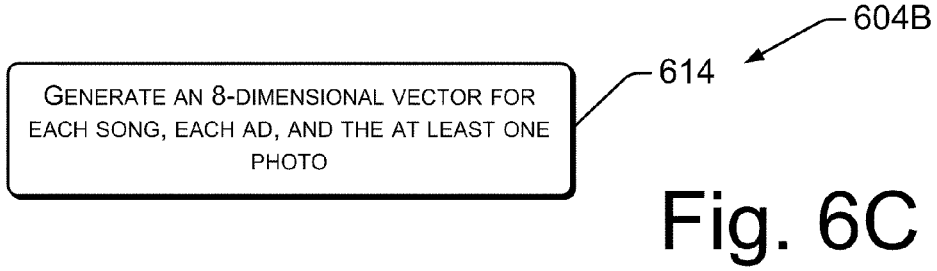

FIG. 6C describes a further alternative and/or supplemental operation 604C to the mapping operation of block 604. At operation 614, an 8-dimensional vector is generated for the at least one photo, each song and each advertisement. This generation may be performed by the mapping procedures 114-118 of FIGS. 1 and 4. In one example, eight vector components—or coefficients for associated with unit vectors in each orthogonal direction—are generated. For example, each value in an 8-tuple describing the 8-dimensional vector can be assigned a real number. The assignment may be based on fit of the photo, song or ad being mapped to an associated one of eight human conditions associated with the eight dimensions of the style and mood ontology. In one example, the eight human conditions can be defined as: aggression, arousal, euphoric, pleasant, calm, non-arousal, melancholic and unpleasant. Thus, each photo, song and ad can be mapped to an 8-dimensional vector defined in the style and mood ontology, and can be written as an 8-tuple, wherein each of the eight terms is a real valued number.

Figure 7:
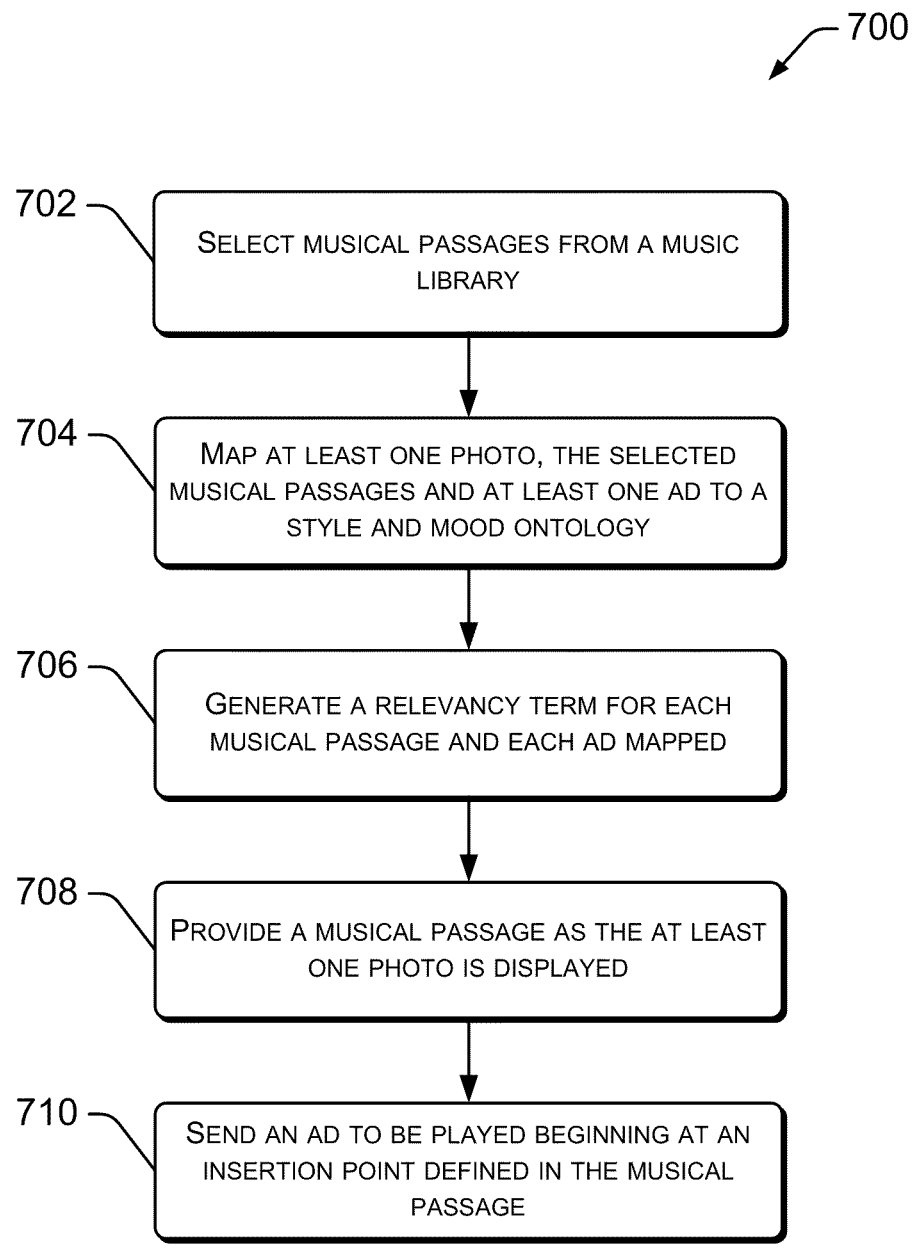
FIG. 7 is a flow diagram illustrating a further example process for providing photo browsing enhanced by recommended music and advertising. The example process of FIG. 7 can be understood, in part, by reference the configuration of FIG. 1 or 4—although the concepts of FIG. 7 are not exclusive to a particular system or configuration.

FIG. 7 is a flow diagram illustrating a further example process 700 for providing photo browsing enhanced by recommended music and advertising. The example process of FIG. 7 can be understood in part by reference the configuration of FIGS. 1 or 4, although a configuration alternative to FIGS. 1 and 4 could be consistent with the example of FIG. 7. Process 700 begins with operation 702, where musical passages are selected from a music library. In the example of FIGS. 1 and 4, a text-based ranking procedure 108 is used to select and/or rank the musical passages (e.g. songs) from the music library 104 according to relevance to the photo album 102. Note that the songs that are "selected" may be the songs having higher relevance to the photo album, and therefore the highest rank. Similarly, advertisements may be selected (and/or ranked) from an ad library 106 by a text-based relevancy-ranking procedure 110. In both cases, the selected song and ad are selected based on rank or relevancy to the photo album 102. The relevancy to the photo album can be determined based on the photo album 102 as a whole, or based on one or more representative photos from the album.

At operation 704, at least one photo, and at least some of the selected songs and optionally, at least some of the selected advertisements, are mapped to a style and mood ontology. The mapping creates or obtains vector-based representations of each mapped photo, each mapped musical passage and each mapped advertisement. The vector-based representations obtained can include real-valued vector component terms. The real-valued component terms may be thought of as coefficients for unit vectors associated with each dimension in the vector space of the style and mood ontology. In the example of FIGS. 1, 2 and 4, each real-valued vector component term assesses a degree of fit between a human condition and the musical passage.

At operation 706, a relevancy term is generated for each musical passage (e.g., each song) and each advertisement mapped. The relevancy terms indicate relevancy of the song and advertisements to the photo album. Intuitively, the relevancy terms indicate desired and/or appropriate songs, and possibly advertisements, to be played during sequential display of photos from the photo album. In an example from FIGS. 1 and 4, the relevancy terms are calculated by a relevancy re-ranking procedure 120, and may be calculated as $R=w_1 r_1 + w_2 r_2$.

At operation 708, a musical passage (e.g. a song) may be provided as at least one photo is displayed. In one example, a number of photos from the photo album 102 are displayed sequentially, such as on visual display 122 (FIGS. 1 and 4). The song may be selected from among the songs within the music library 104 based on relevancy to the photo album 102, as determined by operation 706, and may be played on speakers 126-128.

At operation 710, an ad is selected according to relevancy terms from operation 706. The selected ad is sent to a user interface (e.g. interface 500 of FIG. 5, including speakers 126-128 of FIGS. 1 and 4) for play at an advertising insertion point 144. Such an advertising insertion point 144 can be determined by the ad insertion location procedure 416 of FIG. 4.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed under control of one or more processors configured with executable instructions, the method comprising:
ranking a plurality of musical passages for relevance to a photo album, the ranking utilizing text-based metadata associated with the plurality of musical passages and the photo album;
mapping the musical passages and at least one photo from the photo album to a style and mood ontology, each mapping obtaining a vector-based representation of the mapped musical passage or photo with respect to the style and mood ontology;
re-ranking, by the one or more processors, the musical passages for relevance to the photo album using input from both the ranking and the mapping, the re-ranking generating a relevancy term for each musical passage to the photo album by calculating, for each musical passage of the plurality of musical passages, a relevance term $R=w_1 r_1 + w_2 r_2$, wherein:
$w_1$ and $w_2$ are scalars used to weight $r_1$ and $r_2$, $w_1+w_2=1$, $0<=w_1<=1$, and $0<=w_2<=1$;
$r_1$ is a scalar representing relevance obtained from ranking musical passages for relevance;
$r_2$ is a scalar representing relevance obtained from the mapping, $r_2=1-d(v_1,v_2)$;
$v_1$ is a vector representing a mapping of the at least one photo; and
$v_2$ is a vector representing a mapping of a musical passage; and
selecting, based at least in part on the generated relevancy terms, a musical passage to be played during sequential display of a plurality of photos of the photo album on a user interface.

2. The method of claim 1, wherein the mapping comprises:
generating a multi-dimensional vector associated with the photo album; and
generating a multi-dimensional vector associated with each musical passage in a music library;
wherein the multi-dimensional vectors comprise real-valued vector components associated with each dimension to express a fit with an associated human condition.

3. The method of claim 1, wherein the mapping comprises generating an 8-dimensional vector for each musical passage, and wherein vector components for each vector are real number values assigned based at least in part on fit to human conditions comprising aggression, arousal, euphoric, pleasant, calm, non-arousal, melancholic and unpleasant.

4. The method of claim 1, wherein the mapping comprises:
evaluating the musical passages for tempo, pitch and intensity; and
associating the tempo, pitch and intensity with a real value for each of a plurality of human conditions.

5. The method of claim 1, wherein the mapping comprises:
assigning real-valued component terms to each vector-based representation, each real-valued component term assessing a degree to which a human condition is indicated by each musical passage; and
assigning real-valued component terms to each vector-based representation, each real-valued component term assessing a degree to which a human condition is indicated by the at least one photo.

6. The method of claim 1, wherein the generated relevancy term is based at least in part on a weighted summation of a scalar term derived from the ranking and a scalar term derived from a distance function operating on the vector-based representations of the mapping.

7. The method of claim 1, additionally comprising:
selecting advertisements from an advertisement library based at least in part on text-based relevance to the at least one photo;
mapping the selected advertisements to the style and mood ontology;
generating a relevancy term for each of selected advertisements based at least in part on the selecting and the mapping; and
selecting, based at least in part on the generated relevancy terms, an advertisement to be played beginning at an insertion point defined in the musical passage.

8. One or more computer-readable media excluding carrier signals and storing computer-executable instructions that are executable by one or more processors to perform acts comprising:
ranking a plurality of musical passages for relevance to at least one photo from a photo album, the ranking utilizing text-based metadata associated with the plurality of musical passages and the photo album;
mapping the musical passages and the photo album to a style and mood ontology to obtain vector-based representations for each of the plurality of musical passages and the photo album with respect to the style and mood ontology;

re-ranking the musical passages for relevance to the photo album by summing a weighted relevancy term $R=w_1 r_1 + w_2 r_2$, for each musical passage, wherein:

$w_1$ and $w_2$ are scalars used to weight $r_1$ and $r_2$, and wherein $w_1+w_2=1$, $0<=w_1<=1$, and $0<=w_2<=1$;

$r_1$ is a scalar representing relevance of a musical passage to the at least one photo, obtained from ranking the musical passage with a text-based algorithm; and $r_2$ is a scalar representing relevance of the musical passage to the at least one photo, obtained from the mapping, $r_2 = 1 - d(v_1, v_2)$, $v_1$ is a vector representing a mapping of the at least one photo to the style and mood ontology, and $v_2$ is a vector representing a mapping a musical passage to the style and mood ontology; and selecting, based on the re-ranking, a musical passage to be played during display of photos from the photo album.

9. The one or more computer-readable media as recited in claim 8, wherein the mapping comprises:

generating a multi-dimensional vector associated with the photo album; and generating a multi-dimensional vector associated with each musical passage in the plurality of musical passages, the multi-dimensional vectors including real-valued vector components associated with each dimension to express a fit with an associated human condition.

10. The one or more computer-readable media as recited in claim 8, wherein the mapping comprises:

generating an 8-dimensional vector for each musical passage, and the at least one photo, wherein each 8-dimensional vector includes eight vector components with real number values.

11. The one or more computer-readable media as recited in claim 10, wherein:

the eight vector components correspond to eight human conditions comprising aggression, arousal, euphoric, pleasant, calm, non-arousal, melancholic and unpleasant.

12. One or more computer-readable media as recited in claim 8, further comprising:

selecting advertisements from an advertisement library based at least in part on text-based relevance to the at least one photo;

mapping the selected advertisements to the style and mood ontology;

generating a relevancy term for each of selected advertisements based at least in part on the selecting and the mapping;

sending an advertisement, obtained by consideration of the relevancy terms, to be played beginning at an insertion point defined in the provided musical passage; and the ranking, mapping and re-ranking are performed on a server.

13. The one or more computer-readable media as recited in claim 12, further comprising:

calculating an insertion point within the provided musical passage; and inserting an advertisement at the insertion point.

14. A computing device, comprising:

one or more processors; and a memory device storing instructions that are executable by the one or more processors to perform acts comprising:

ranking musical passages from a music library based at least in part on relevance of each of the musical passages to at least one photo of a photo album, using a text-based relevancy-ranking procedure;

mapping the musical passages and the at least one photo to a style and mood ontology to obtain:

vector-based representations of each selected musical passage, each vector-based representation comprising real-valued vector component terms, each assessing a degree of fit between a human condition and the musical passage; and vector-based representations of each photo mapped, each vector-based representation comprising real-valued vector component terms, each assessing a degree of fit between a human condition and the at least one photo;

determining a relevancy term for each mapped musical passage with respect to the at least one photo, the relevancy term comprising $R=w_1 r_1 + w_2 r_2$, wherein:

$w_1$ and $w_2$ are scalars used to weight $r_1$ and $r_2$, $w_1+w_2=1$, $0<=w_1<=1$, and $0<=w_2<=1$;

$r_1$ is a scalar representing relevance obtained from selecting musical passages according to the text-based relevancy-ranking procedure;

$r_2$ is a scalar representing relevance obtained from the mapping, $r_2 = 1 - d(v_1, v_2)$, $v_1$ is a vector representing a mapping of the at least one photo; and $v_2$ is a vector representing a mapping of the selected musical passage; and providing a musical passage, selected using the generated relevancy terms, for concurrent display with the at least one photo.

15. The computing device as recited in claim 14, wherein the mapping comprises generating an 8-dimensional vector for each musical passage, where vector components for each 8-dimensional vector are real number values assigned based at least in part on fit of a musical passage to human conditions comprising aggression, arousal, euphoric, pleasant, calm, non-arousal, melancholic and unpleasant.

16. The computing device as recited in claim 14, wherein:

the mapping comprises generating a vector for each of a plurality of musical passages, generating of a vector for the at least one photo, and each vector generated comprises vector component terms, each assigned a real value associated with a degree of fit between a musical passage and a human condition.

17. The computing device as recited in claim 14, wherein the mapping comprises:

evaluating each of the musical passages based on tempo, pitch and intensity.

18. The computing device as recited in claim 17, further comprising:

comparing the evaluated tempo, pitch and intensity with each of the plurality of human conditions, to obtain a real number result indicating a degree to which the evaluated tempo, pitch and intensity fits each human condition.

19. The computing device as recited in claim 14, further comprising:

selecting advertisements from an advertisement library based at least in part on text-based relevance to the at least one photo;

mapping the selected advertisements to the style and mood ontology;

generating a relevancy term for each of selected advertisements based at least in part on the selecting and the mapping; and sending an advertisement, obtained by consideration of the relevancy terms, to be played beginning at an insertion point defined in the provided musical passage.

20. The computing device as recited in claim 19, further comprising:

calculating an insertion point within the provided musical passage; and inserting an advertisement at the insertion point.

\* \* \* \* \*